(12) United States Patent
Rachwalski et al.

(10) Patent No.: US 7,978,761 B2
(45) Date of Patent: Jul. 12, 2011

(54) METHOD AND SYSTEM FOR LOSS-TOLERANT MULTIMEDIA MULTICASTING

(75) Inventors: Jon Rachwalski, Holbrook, NY (US); Daniel Witt, Center Moriches, NY (US)

(73) Assignee: VectorMAX Corporation, Farmingdale, NY (US)

( * ) Notice: Subject to any disclaimer, the term of this patent is extended or adjusted under 35 U.S.C. 154(b) by 1586 days.

(21) Appl. No.: 11/244,444

(22) Filed: Oct. 5, 2005

(65) Prior Publication Data
US 2006/0083236 A1    Apr. 20, 2006

Related U.S. Application Data

(60) Provisional application No. 60/615,989, filed on Oct. 5, 2004.

(51) Int. Cl.
*H04B 1/66* (2006.01)
(52) U.S. Cl. .................. 375/240; 375/429; 348/469
(58) Field of Classification Search .............. 375/240; 370/389, 429, 498, 537; 386/111, 125
See application file for complete search history.

(56) References Cited

U.S. PATENT DOCUMENTS

| | | | | |
|---|---|---|---|---|
| 5,287,178 A * | 2/1994 | Acampora et al. | ......... | 348/384.1 |
| 5,289,276 A * | 2/1994 | Siracusa et al. | .............. | 348/469 |
| 6,078,594 A * | 6/2000 | Anderson et al. | ............. | 370/498 |
| 6,573,945 B1 * | 6/2003 | Wu et al. | .................. | 348/584 |
| 6,574,423 B1 * | 6/2003 | Oshima et al. | ................ | 386/329 |
| 6,577,640 B2 * | 6/2003 | Mansouri et al. | ............. | 370/429 |
| 6,661,813 B2 * | 12/2003 | Karasawa | ...................... | 370/537 |
| 6,724,434 B1 * | 4/2004 | Aaltonen | ....................... | 348/565 |
| 6,798,418 B1 * | 9/2004 | Sartori et al. | ................. | 345/519 |
| 6,963,608 B1 * | 11/2005 | Wu | .......................... | 375/240.03 |
| 2003/0108341 A1 * | 6/2003 | Oshima et al. | ................ | 386/125 |
| 2006/0064716 A1 * | 3/2006 | Sull et al. | ........................ | 725/37 |

FOREIGN PATENT DOCUMENTS
WO    WO 2004/075554 A    9/2004
WO    WO 2004/075554 A1    9/2004

OTHER PUBLICATIONS

Hirofumi, "Communication Equipment, Method and System", Jul. 2, 1999, Pub. #: 11177948, Appln. #: JP 09341249, Patent Abstracts of Japan, vol. 1999, No. 12, Oct. 29, 1999. Cited in corresponding PCT application.
Hu Imm Lee, "Internet Transmission of Real-Time MPEG Video", Thesis [Online], 1998, pp. 1-48, Internet: <http://www.mtholyoke.edu/acad/comsc/Honors/Hu-Imm-Lee/Thesis.htm>, cited in corresponding PCT application.

(Continued)

*Primary Examiner* — Wesley Tucker
*Assistant Examiner* — Aklilu k Woldemariam
(74) *Attorney, Agent, or Firm* — Jack Schwartz & Associates, PLLC

(57) ABSTRACT

A method and system are provided for ordering datagrams within an encoded datastream. The system includes a parser for separating headers from each respective datagram. A decoder decodes the separated headers to determine a frame group, a frame number within the frame group, a datagram number within the frame; and a total number of datagrams within the frame. An address generator determines a position for each datagram within the datastream and orders the datagrams within the datastream in response to decoding of the header to produce a video data stream.

21 Claims, 6 Drawing Sheets

| Bits 0-7 | Bits 8-15 | Bits 16-23 | Bits 24-31 |
|---|---|---|---|
| Frame Group Identifier | Frame Identifier | Datagram Identifier | # of Datagrams per Frame |

OTHER PUBLICATIONS

Vinay Chandrasekhar, "A Framework for Quality of Service Analysis of IP Based Video Networks", Thesis [Online], Jul. 2003, pp. 1-109, Internet: <http;//renoir.csc..ncsu.edu/Faculty/Vouk/Papers/Chandrasekhar/Chandrasekhar_MS_Thesis.pdf>, cited in corresponding PCT application.

Alexandre Denis, "Variable Reliability Protocol", USC/ Information Sciences Institute [Online], Jun. 7, 1999, pp. 1-54, Internet: <www.irisa.fr/paris/Bibvlis/Papers/Denis/Den99MIM2.ps>, cited in corresponding PCT application.

* cited by examiner

| Bits 0-7 | Bits 8-15 | Bits 16-23 | Bits 24-31 |
|---|---|---|---|
| Frame Group Identifier | Frame Identifier | Datagram Identifier | # of Datagrams per Frame |

Fig. 1

METHOD AND SYSTEM FOR LOSS-TOLERANT MULTIMEDIA MULTICASTING

CROSS REFERENCE TO RELATED APPLICATIONS

This is a non-provisional application of U.S. Provisional Application Ser. No. 60/615,989 filed Oct. 5, 2004.

FIELD OF THE INVENTION

The present invention relates to a method and system for transmitting and sequencing video data and, more specifically, to minimizing sequencing errors in a video data stream.

BACKGROUND OF THE INVENTION

Protocols currently exist for transmitting large quantities of information across the internet. Among these protocols, Real Time Protocol (RTP) is the standard protocol used for streaming multimedia streams across a network.

A packet is the fundamental unit of information. Examples of existing systems that use packets require a connection setup stage prior to transmitting packets using datagrams. A datagram is a self-contained packet comprising a header including information allowing the network to forward the datagram to the intended destination independently of previous or future datagrams. A packet consists of three elements. The first element is a header, which contains the information needed to get the packet from the source to the destination. The second element is data payload. The third element of packet is a trailer, which often contains techniques ensuring that errors do not occur during transmission.

The header of each packet includes a plurality of fields that include instructions for the receiving system for handling the received packet. RTP requires a header having a minimum of 12 bytes per packet. These headers are generally 96 bits in length. It is desirable to reduce the overall size of a packet and its header to substantially reduce the bandwidth cost associated with transmission of data packets.

A multimedia data stream includes a plurality of encoded frames of video data. When packets containing multimedia data are transmitted there may be a loss of data occurring during transmission. This loss of data results in choppy playback that diminishes the replay quality of multimedia data steam when decoded and displayed using a media player application. This problem is accentuated when the data being transmitted is being multicasted for receipt by a plurality of users. Existing systems requires significant overhead when asked to handle a data stream that is not received in its entirety or is received out of order. Furthermore, these systems merely contemplate ordering packets at the transport level and are not concerned with ordering data below this level, such as the order of the frames that make up the stream which is being transported. Reducing data loss at the frame level is highly desirable and produces an improved playback of received mulitcasted multimedia data streams.

Therefore, there is a need for a protocol which eliminates the loss-tolerant nature of multicasting. Furthermore, when transmitting a multimedia stream, transmitting over an unreliable channel can make stream corruption due to out of order delivery virtually undetectable and uncorrectable. Therefore, there is a need for a system and protocol that can detect and, when possible, correct multicast datagram delivery failures.

A system according to invention principles addresses these deficiencies and associated problems.

SUMMARY OF THE INVENTION

A method and apparatus is provided for ordering datagrams representing frames within an encoded datastream. The method includes separating headers from each respective datagram. The separated headers are then decoded to determine a frame group, a frame number within the frame group, a datagram number within the frame; and a total number of datagrams within the frame. A position is then determined for each datagram within the datastream and the datagrams are ordered within the datastream in response to decoding of the header to produce a video data stream.

A method and system for encoding digital video data into an encoded datastream. An interface receives the digital video data and a packet processor packetizes the received digital video data into a plurality of packets of digital data individually including data identifying a destination address. An individual packet includes indicators. The indicators include an identifier identifying a group of video frames, a video frame identifier within a group of video frames, a packet identifier within a video frame and a total number of packets within a video frame. A datastream generator generates data representing individual packet headers and incorporating the headers in corresponding respective packets, an individual packet header including the indicators.

BRIEF DESCRIPTION OF THE DRAWING FIGURES

FIG. 1 is an illustrative view of the 32 bit header of a datagram according to invention principles;

DETAILED DESCRIPTION OF THE INVENTION

Figure 2:
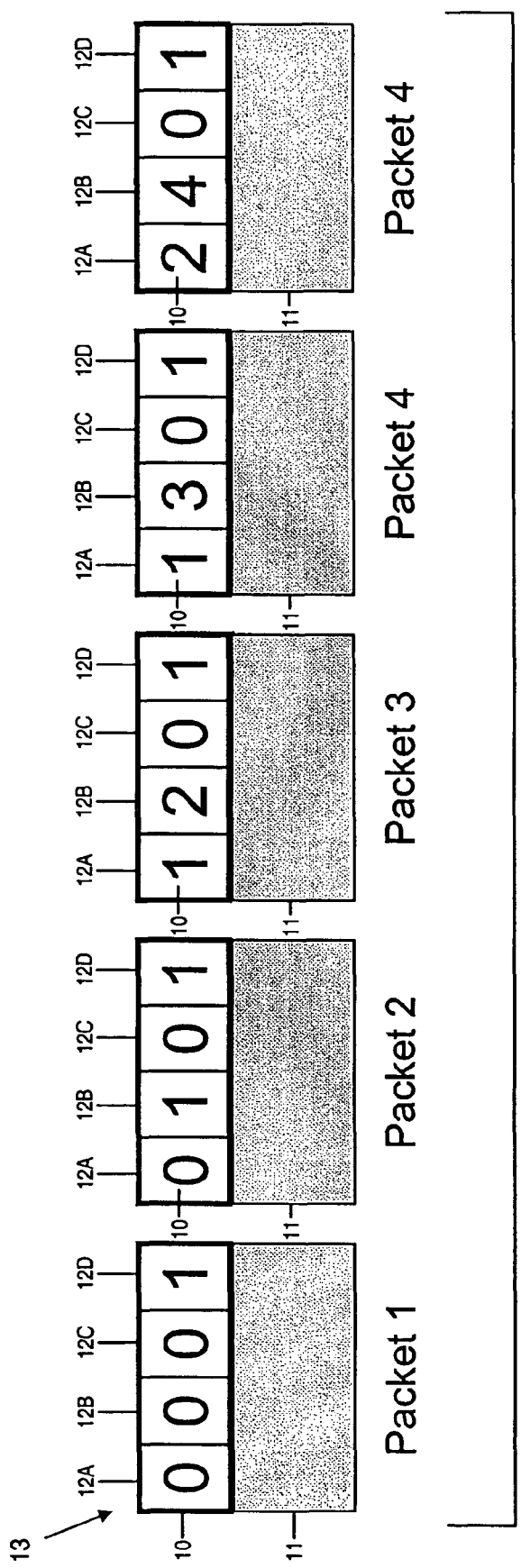
FIG. 2 is an illustrative view of a plurality of datagrams of a respective data stream according to invention principles.
Figure 3:
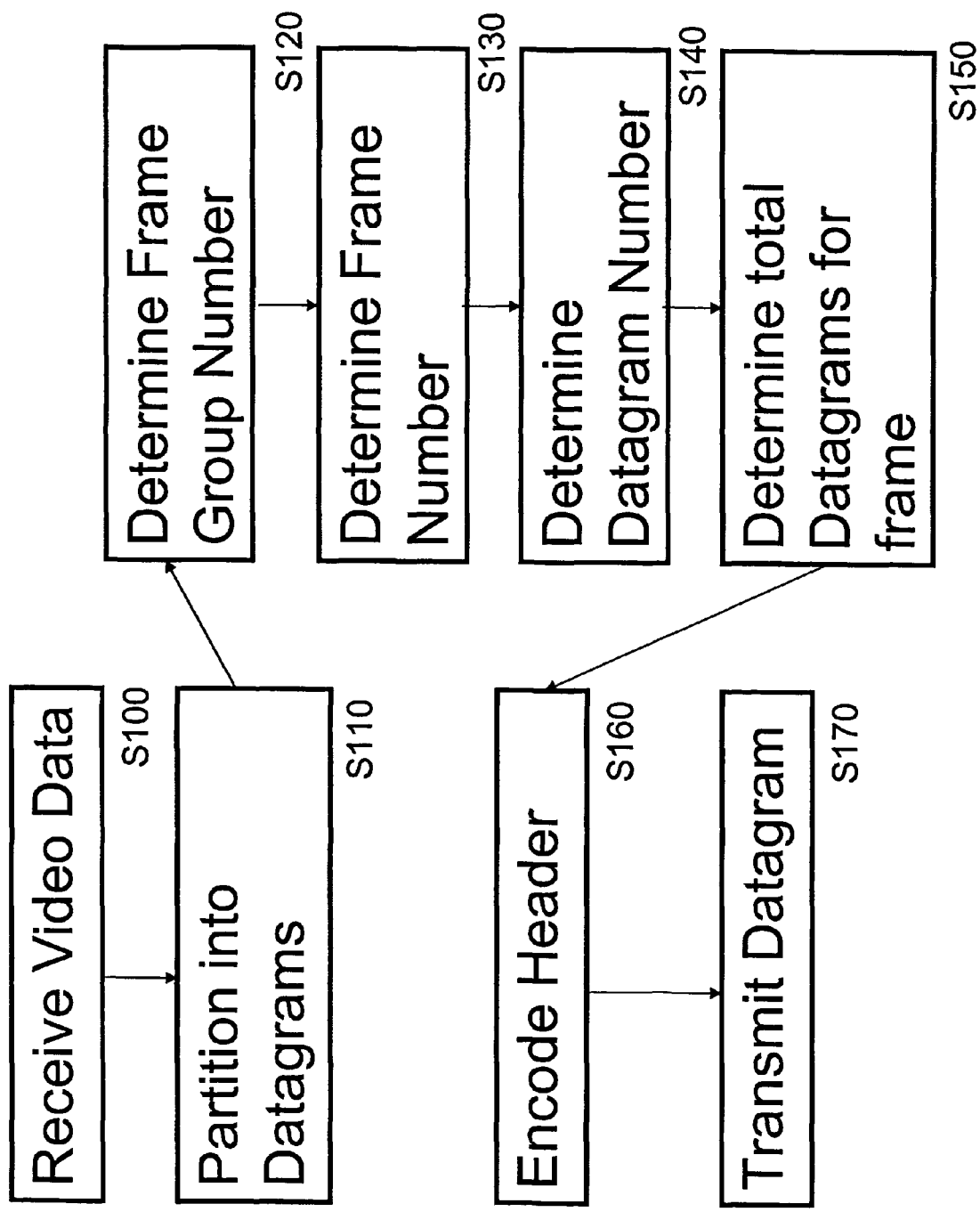
FIG. 3 is a flowchart detailing the process of encoding a header with a respective packet according to invention principles.

An application as used herein is an executable computer program or set of instructions comprising code or machine readable instruction for implementing predetermined functions including those of an operating system, healthcare information system or other information processing system, for example, in response user command or input. An executable procedure is a segment of code (machine readable instruction), sub-routine, or other distinct section of code or portion of an executable application for performing one or more particular processes and may include performing operations on received input parameters (or in response to received input parameters) and provide resulting output parameters. A processor as used herein is a device and/or set of machine-readable instructions for performing tasks. A processor comprises any one or combination of, hardware, firmware, and/or software. A processor acts upon information by manipulating, analyzing, modifying, converting or transmitting information for use by an executable procedure or an information device, and/or by routing the information to an output device.

A processor may use or comprise the capabilities of a controller or microprocessor, for example. Multimedia content or content stream as used herein is any encoded or un-encoded data having at least one of video data and audio data. A multicast data stream as used herein comprises a continuous stream of data having at least one of video and audio-video data encoded therein originating from a single source that transmitted and broadcast to members of a specified group or users or a specified system. A frame as used herein is represents an atomic unit of application data and a frame group refers to a group of frames.

Furthermore, all functions of FIGS. 1-6 can be implemented using software, hardware or a combination thereof.

The system provides a unique header for the respective datagram encoded thereby. The datagram header includes 32 bits, divided into 4 bytes. The first byte of the header includes a frame group identifier that identifies the frame group within a formatted stream. The second byte of the header includes a frame identifier that identifies the frame within a frame group of the formatted stream. The third byte of the header includes a datagram identifier that identifies the datagram within the frame. The fourth byte of the header includes a numerical value representing the number of datagrams required to represent the entire frame. The four identifiers included within the header of the system protocol allows for a receiver to decode the video data without fear of faulty sequencing. Additionally, the reduced size of the header (32 bits as compared to 96 required in IPv4) reduces the required bandwidth needed to transmit the datagrams.

The system provides a broadcaster that minimizes the loss-intolerant nature of multicasting multimedia content. In furtherance of this goal, an encoded frame is partitioned into multicastable datagrams. A method of incorporating ordering data into the logical structure is performed on the multicasting system. In accordance with this method, a portion of the datagram is designated for holding ordering data. The ordering data is stored in the designated section of the datagram. This ordering is placed in four (4) single byte fields which reduces the bandwidth required to transmit the datagrams.

In the system, a receiver is provided to that can detect and, when possible, correct multicast datagram delivery failures in order to minimize stream corruption. Commonly transmitted datagrams are broadcast over networks utilizing unreliable datagram services. In these systems ordering and delivery of datagrams cannot be guaranteed. Therefore, the system receives multimedia multicast data wherein the frame of multimedia broadcast data is divided into one or more datagrams. The received datagrams each include the aforementioned frame data as well as header information. The header information of the received datagrams is analyzed. The header information details the relative order of the frame or frame segment within the reconstructed multicast multimedia datastream. By receiving detailed ordering data within the header, lost or out of order datagrams can be detected and corrected and thus, stream framing will not be affected. When it is dertermined that a datagram has been lost, the frame is dropped. However, when datagrams are determined to be out of order, the datagrams are reordered in the correct positions within the frame.

The system 10 provides a mechanism for controlling the ordering of datagrams representing frames of video data within a multimedia data stream. This ordering is processed at the application level. The ordering performed by the system is a higher ordering structure than used in previous systems which are only concerned with ordering packets of data that comprise a data stream and which are received by a system. In contrast, the system is concerned with ordering the frames within the received data stream by an application for decoding and displaying the multimedia data of the data stream.

FIG. 1 is an illustrative view of the 32 bit header associated with a respective datagram encoded by the system. Unlike the header of an IPv4 datagram which uses a 192 bit header with 96 bits used for controlling datagram flow over a network and for providing positional information representing the position of the respective datagram within a datastream, the header 10 of the system datagram uses 32 bits. The 32 bits are divided into 4 bytes of 8 bits. The first byte 12A includes bits 0-7 and contains a frame group identifier. The frame group identifier identifies the frame group within the stream to which the datagram belongs. The second byte 12B includes bits 8-15 and contains a frame identifier. The third byte 12C includes bits 16-23 and contains a datagram identifier. The datagram identifier identifies the position of a datagram within the frame indicated by the frame identifier. The fourth byte 12D (bites 24-31) is a value indicating the total number of datagrams within the transmitted frame. This value facilitates determining if a complete or partial frame has been received.

The values within each of the first byte 12A and second byte 12B are incremented using a rolling count ranging between 0 and 256. This provides a direct order of a specific frame with respect to other frames within a respective data stream over a limited period of time which improves the ability to order frames. This improvement results from a decoder that is receiving the stream to know the precise position of a respective frame relative to other frames within a predefined time window.

FIG. 2 shows a plurality of packets 13 including the system header 10 and a payload 11 that form a multimedia data stream. For example, the illustrated multimedia data stream includes three frame groups, each frame group includes two frames and each frame is comprised of a single data gram. Therefore, the values encoded in the third byte field 12C is "0" representing the datagram number within the frame and the value encoded in the fourth byte field 12D is also "1" and indicates that the total number of datagrams in the respective frame is equal to "1". The third and fourth byte fields 12c, 12d will not be discussed further because their values are constant in the example illustrated in FIG. 2. However, the values for the third and fourth byte field 12c, 12d are not always constant and they are assigned in response to manner in which the multimedia data stream is partitioned prior to encoding of the header.

A value of "0" representing frame group 1 is encoded within the first byte field 12A of each packet 13 that forms frame group 1. Each of the two frames that comprise group 1 will be encoded in the second byte field 12B beginning with the value "0" associated with the first frame of frame group 1 and the value of "1" associated with the second frame of frame group 1.

The second frame group includes a value of "1" encoded in the first byte field 12A of each packet forming frame group 2. Frame 1 of frame group 2 includes a value of "2" encoded in the second byte field 12B and frame 2 of frame group 2 includes a value of "3" encoded in the second byte field.

The third frame group includes a value of "2" encoded in the first byte field 12A of each packet forming frame group 3. Frame 1 of frame group 3 includes a value of 4 encoded in the second byte field 12B.

The numbering in each of the first byte field 12D and the second byte field 12B are incremented until a maximum value of 256 is reached in each byte field independently of one another. Once the maximum value is reached the values return to "0" and are incremented in the same manner.

A video datastream including a plurality of video frames is received as indicated in step S100. The received video data stream is partitioned as described in step S110 into datagrams containing portions of the received video data. Once partitioned into datagrams, the system determines the position of each respective partitioned datagram within encoded stream by performing steps S120-S150 as described below on each datagram.

In step S120, a frame group number, indicating the position of a respective group of frames within the received video data stream, is determined for the datagram. In step S130, a frame number for the datagram which indicates the position of that particular frame within the frame group as determined by Step S120 of the received video data, is determined for the datagram. A datagram number is determined in step S140. The datagram number, as determined in step S140, indicates the position of the respective datagram within the determined frame of the determined frame group. Step S150 determines the total number of datagrams required to complete the determined frame of the determined frame group. These four determined quantities are encoded within the four byte header of the respective datagram in step S160. The number of frame groups, frames within each respective frame group, datagrams per frame and total number of datagrams are determined by the coding scheme used to encode the video data.

The header encoding step of S160 includes encoding the frame group value determined in step S120 within the first byte field of the header. The frame number value determined in step S130 is encoded within the second byte field of the header. The datagram number as determined in step S140 is encoded within the third byte field of the header and the total number of datagrams needed to complete the frame as determined in step S150 is encoded within the fourth byte field of the header. The header is then attached to payload of the datagram which includes video frame data. The datagram is transmitted in step S170.

Figure 4:
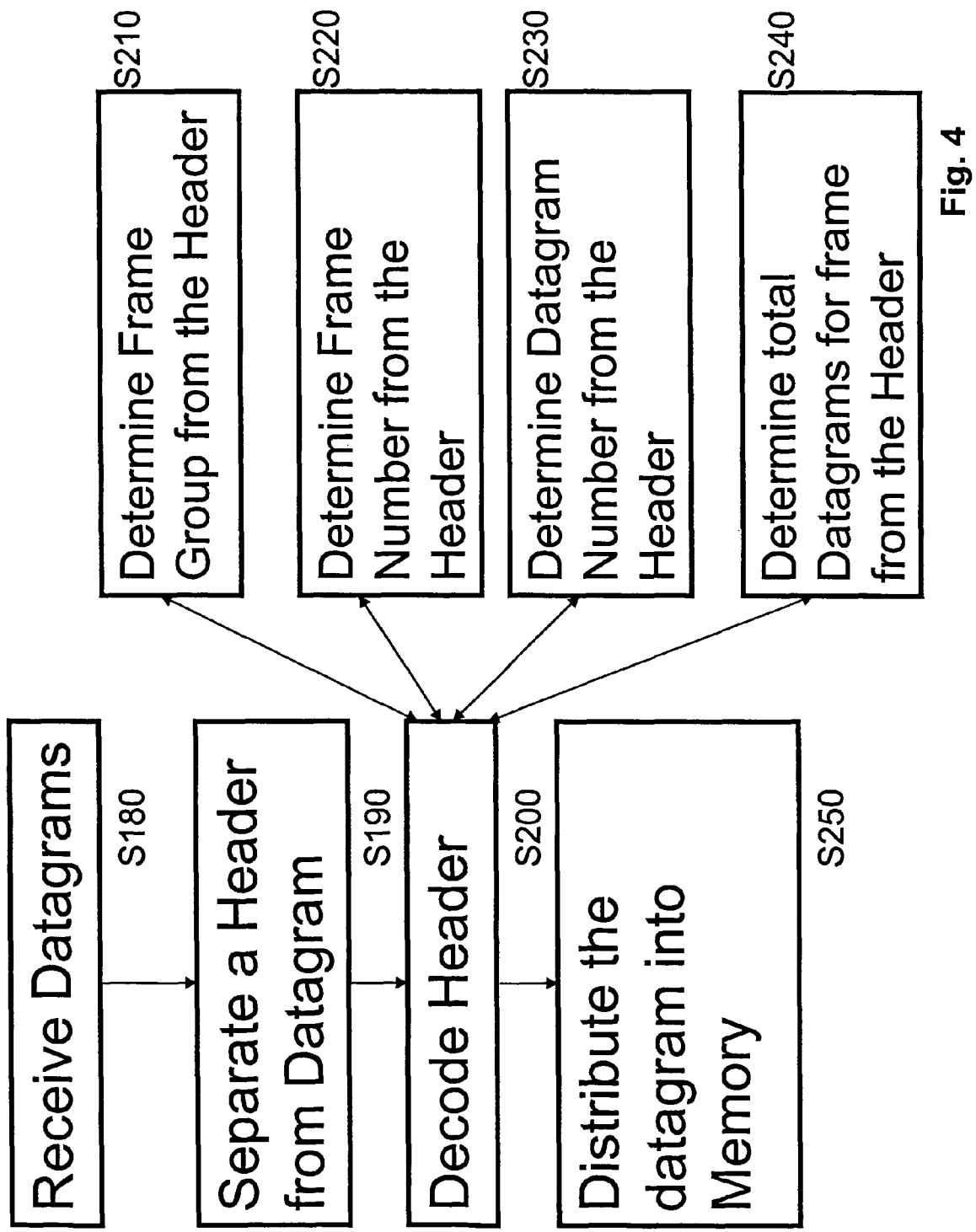
FIG. 4 is a flowchart of the operations of the receiver according to invention principles.

FIG. 4 is a flowchart detailing the operations of the receiver when receiving a data stream encoded by the system discussed above in FIG. 3. The system begins upon receipt of broadcast video data datagrams in Step S180. The header is separated for analysis in step S190 before being decoded in step S200. In step S210, the value encoded within the first byte field of the header is examined to determine the frame group to which the datagram belongs. In step S220, the value encoded within the second byte field of the header is examined to determine the frame number associated with the respective datagram which indicates the position of the frame within the determined frame group. Once the frame number is determined, the value encoded in the third byte field of the header is examined in step S230 for determining the datagram number which defines the position for the respective datagram within the determined frame. Step S240 provides for examining of the fourth byte field of the header to realize the total number of datagrams needed to form the determined frame. Once the decoder obtains the values from the header, an application in response to the values obtained from steps S210-S240, at least one of positions and redistributes within a memory, the respective received datagram in the proper position. The application is able to process and view the originally encoded frames of data that comprise a multimedia datastream.

Figure 5:
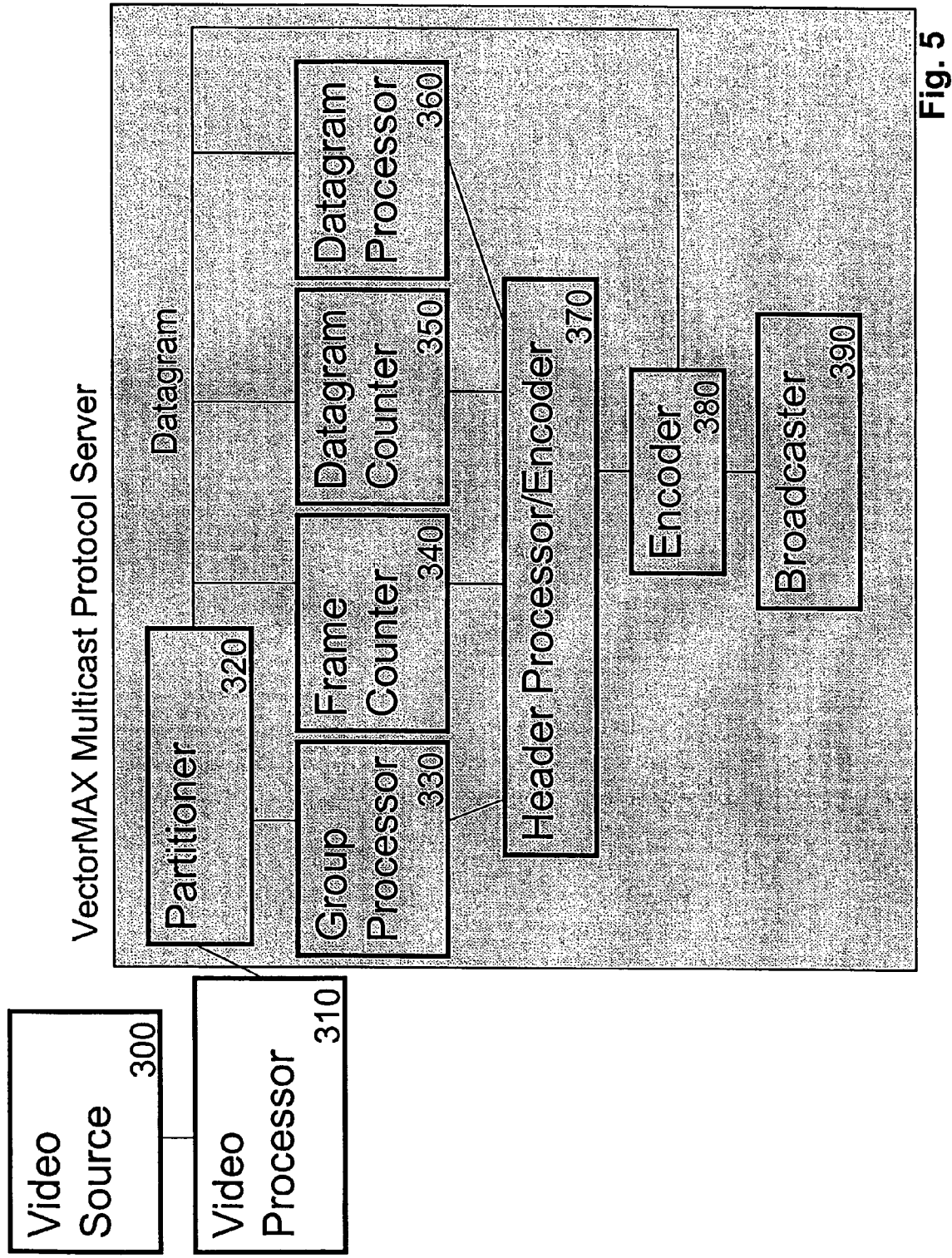
FIG. 5 is a block diagram of the Server according to invention principles.

FIG. 5 is a block diagram of the server for encoding datagrams using the system protocol. Video source 300 generates, encodes and provides video data to video processor 310 for processing thereof. The video data may be encoded in any of a compressed or uncompressed format. Video processor 310 supplies the processed video data to partitioner 320. Partitioner 320 separates the received data into individual datagrams. Partitioner 320 provides the copies of the datagram to group processor 330, frame counter 340, datagram counter 350, datagram processor 360 and encoder 380. Group processor 330 determines the frame group to which the datagram belongs and transmits data indicating of the determined frame group to header processor/encoder 370. Frame counter 340 determines the position of the frame to which the datagram belongs within the determined frame group and transmits data representing the determined frame number to the header processor/encoder 370. Datagram counter 350 determines the datagram's position within the determined frame and transmits data indicating the datagram number within the respective determined frame to the header processor/encoder 370. The datagram processor 360 determines the total number of datagrams within the determined frame and transmits data indicating the total number of datagrams to the header processor/encoder 370. The header processor/encoder 370 orders the determined data into four bytes, for example, to be encoded into the header of the datagram. This ordered information is transmitted to the encoder which, along with the datagram forwarded from the partitioner 320, encodes the header within the datagram. This datagram is sent to broadcaster 390 and broadcast for receipt by a client application.

Figure 6:
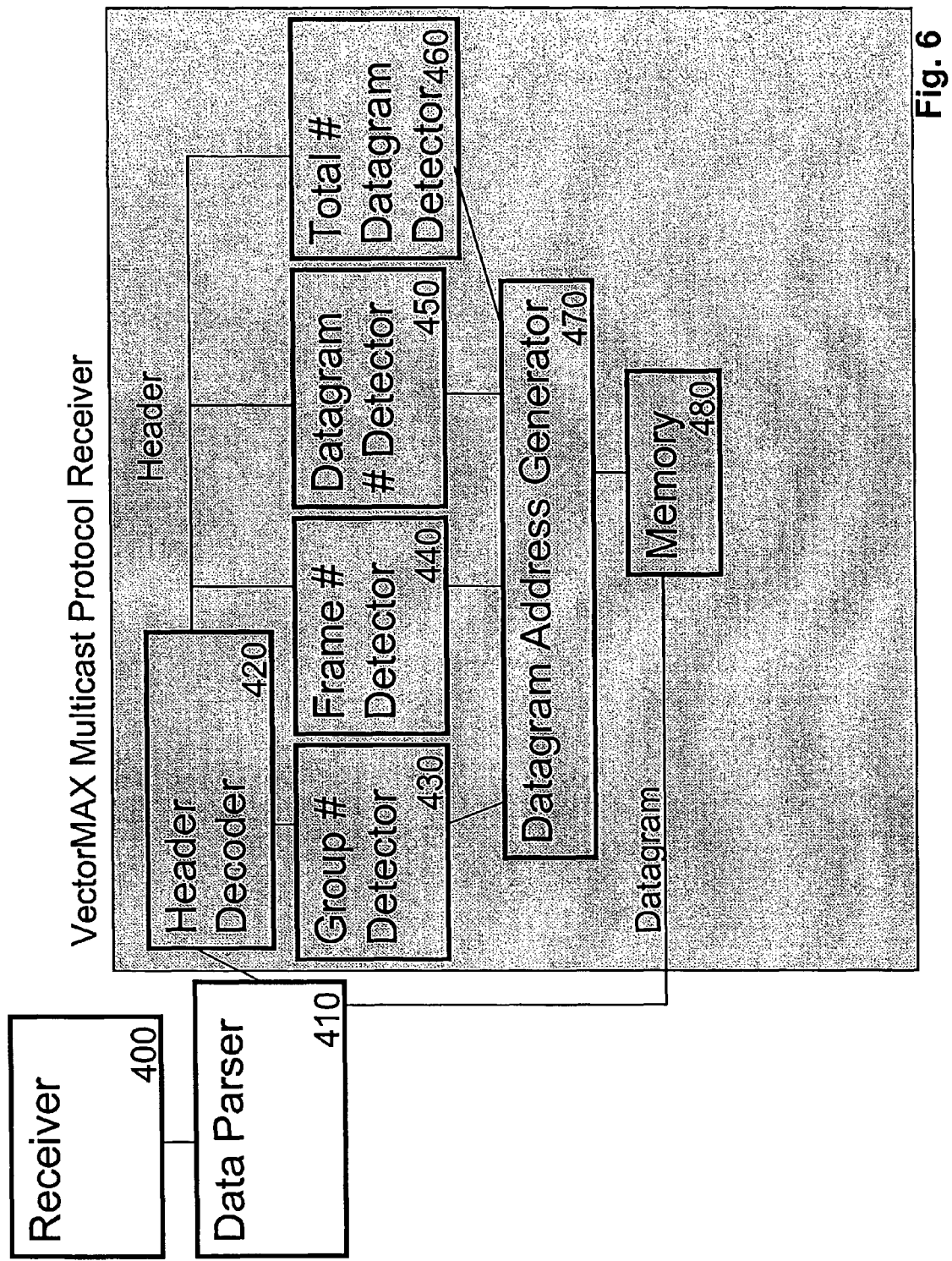
FIG. 6 is a block diagram of the receiver according to invention principles.

FIG. 6 is a block diagram of the receiver of the system. Receiver 400 receives datagrams which are parsed by data parser 410 connected thereto. The data parser 410 separates the header from the received datagram. The header is sent to header decoder 420 and the datagram is sent to memory 480. The header decoder 420 provides the data representing the header information to group number detector 430, frame number detector 440, datagram number detector 450 and total number datagram detector 460. Group number detector 430 analyzes the header information and determines the group number indicating the group to which the datagram belongs. Frame number detector 440 analyzes the header information and determines the frame number of the respective datagram which indicates the position of the frame within the frame group detected by group detector 430. The Datagram number detector 450 analyzes the header information and determines the datagram number which indicates the position of the datagram within the determined frame. The total number datagram detector 460 analyzes the header information and determines the total number of datagrams, indicating the total number of datagrams required to encode/decode the determined frame, of the datagram. The determined group number, frame number, datagram number and total datagram number are transmitted to the datagram address generator 470. Datagram address generator 470 determines the optimal position of the received datagram within memory 480 and transmits an address indicative of that position to memory 480. Memory 480 stores the datagram received from data parser 410 at the address indicated by datagram address generator 470. Memory 480 may subsequently supply the decoded video data to a user using to viewing means or digital recording means.

The system protocol utilized in both the server and receiver exhibit a substantially reduced amount of bandwidth and a more reliable transfer protocol. The server provides the datagram with a minimum set of data, as the header is contained of 32 bits. Therefore, the bandwidth used in transmitting the data over the network is substantially reduced. Additionally, this minimal header contains sets of information detailing the specific location of the respective datagram within the received video data. This information aids the receiver in detecting and correcting lost or out of order data and ensures correct playback of the received data stream.

What is claimed:

1. A system for encoding digital video data into an encoded datastream, comprising:
an interface for receiving digital video data;
a packet processor for packetizing said received digital video data into a plurality of packets of digital data individually including data identifying a destination address, an individual packet including indicators comprising,
an identifier identifying a group of video frames to which said individual packet belongs,
a video frame identifier within a group of video frames identifying a position of the respective video frame within said identified group,
a packet identifier within a video frame identifying a position of said individual packet within said video frame, and
a total number of packets within a video frame; and
a datastream generator for generating data representing individual packet headers and incorporating said headers in corresponding respective packets, an individual packet header including four one-byte fields and said indicators each being incorporated into a respective one-byte field thereby reducing an amount of bandwidth required to transmit said datastream.

2. The system of claim 1, wherein said packet is an internet protocol compatible datagram.

3. The system of claim 1, wherein each of said plurality of packets includes a payload conveying compressed video data.

4. The system of claim 1, wherein said destination address determines a position for each of said plurality of packets within said data stream.

5. A system for decoding an encoded datastream comprising a plurality of packets of digital data individually including data identifying a destination address, comprising:
a parser for identifying a header within individual packets, said header including four one-byte fields, each field including an indicator defining a characteristic of said individual packet;
a decoder for decoding an identified header in an individual packet to identify characteristics based on respective indicators in respective fields of said header including,
a frame group identifier to which said individual packet belongs;
a video frame identifier within a group of video frames identifying a position of the respective video frame within said identified group,
a packet identifier within a video frame identifying a position of said individual packet within said video frame,
a total number of packets within a video frame; and
a datastream generator for reliably determining a position for individual packets within an output datastream and ordering individual packets in said output datastream in response to said characteristics to produce a video data stream.

6. The system of claim 5, wherein said packet is an internet protocol compatible datagram.

7. The system of claim 5, wherein each of said plurality of packets includes a payload conveying compressed video data.

8. The system of claim 5, wherein said destination address determines a position for each of said plurality of packets within said data stream.

9. A system for ordering datagrams within an encoded datastream comprising:
a parser for separating headers from each respective datagram, said headers being formed from four one-byte fields and including indicators associated with a characteristic of said datagram;
a decoder for decoding said separated headers to determine for each respective datagram:
a frame group;
a frame number within the frame group;
a datagram number within the frame; and
a total number of datagrams within the frame;
an address generator for determining a position for each datagram within the datastream and ordering the datagrams within the datastream in response to decoding of the header to reliably order and produce a video data stream.

10. The system of claim 9, wherein said address generator analyzes the datagram number of each received datagram and the total number of datagrams to determine a number and position of datagrams missing from the datastream.

11. The system of claim 9, further comprising a memory for storing said datagrams in an order determined by said address generator.

12. The system of claim 9, further comprising a video display for displaying said datagrams in an order determined by said address generator.

13. A system for creating a datastream, said system comprising:
a video input providing a video stream;
a partitioner for separating the received video stream into a plurality of datagrams;
a processor for determining indicators for each datagram, said indicators including a frame group identifying a group of video frames to which the datagram belongs; frame number identifying a position of the frame in the determined frame group, datagram number identifying the position of the datagram and number of datagrams per frame group;
an encoder for forming a header including the determined frame group; frame number, datagram number and number of datagrams per frame for each datagram and attaching the header to each respective datagram, said header including four one-byte fields and including a respective indicator thereby reducing an amount of bandwidth required to transmit said datastream.

14. The system of claim 13, wherein said processor includes:
a group processor for determining a group number for each datagram;
a frame counter for determining a frame number for each datagram;
a datagram counter for determining a datagram number for each datagram; and
a datagram processor for determining a number of datagrams for each frame.

15. The system of claim 13, further comprising a broadcaster connected to said encoder for transmitting said datagrams including headers.

16. A method of forming a datastream, said method comprising the activities of:
receiving a video stream;
separating the received video stream into a plurality of datagrams;
determining indicators for each datagram,
a frame group identifying a group of video frames to which the datagram belongs;

a frame number identifying a position of the respective video frame within said identified group, a datagram number identifying a position of said individual datagram within the video frame, and a number of datagrams per frame for each datagram;

forming a header having four one-byte fields and including the determined frame group; frame number, datagram number and number of datagrams per frame for each datagram within a respective field of said header thereby reducing an amount of bandwidth required to transmit the formed datastream;

attaching the header to each respective datagram; and ordering the datagrams with headers to form the datastream.

17. The method of claim 16, further comprising the activity of transmitting said datastream.

18. A method of ordering datagrams within an encoded datastream comprising the activities of:

receiving the encoded datastream including datagrams, the datagrams having a header formed from four one-byte fields and including indicators identifying characteristics of the datastream;

separating headers from each respective datagram;

decoding the separated headers to determine from respective fields of the header a frame group identifying a video frame to which the datagram belongs, a frame number within the frame group identifying a position of the video frame within the identified group, a datagram number within the frame identifying a position of the individual datagram within the video frame, and a total number of datagrams within the frame;

determining a position for each datagram within the datastream based on the indicators in a respective header; and ordering the datagrams within the datastream in response to decoding of the header to produce a reliably ordered video data stream.

19. The method of claim 18, further comprising the activities of:

analyzing the datagram number of each received datagram and the total number of datagrams; and determining a number and position of datagrams missing from the datastream.

20. The method of claim 18, further comprising the activity of:

distributing said ordered datagrams to a memory.

21. The method of claim 20, further comprising the activity of:

displaying said datagrams in an order determined by said address generator.

* * * * *